United States Patent [19]

Geithman et al.

[11] Patent Number: 5,414,247

[45] Date of Patent: May 9, 1995

[54] HOT MELT INDUCTION HEATER AND METHOD

[75] Inventors: Glenn A. Geithman, Renton; Duncan P. MacKinnon, Woodinville; Gary D. Benham, Snohomish; Babak Sayyadi, Bothell; Robert T. Yankis, Redmond, all of Wash.

[73] Assignee: The Boeing Company, Seattle, Wash.

[21] Appl. No.: 174,717

[22] Filed: Dec. 29, 1993

[51] Int. Cl.⁶ .................................. H05B 6/06
[52] U.S. Cl. ........................... 219/667; 219/633
[58] Field of Search ............... 219/663, 664, 667, 633; 374/131; 250/338.1

[56] References Cited

U.S. PATENT DOCUMENTS

| | | | |
|---|---|---|---|
| 3,365,563 | 1/1968 | Basinger | 219/9.5 |
| 3,742,174 | 6/1973 | Harnden, Jr. | 219/667 |
| 3,845,268 | 10/1974 | Sindt | 219/10.77 |
| 4,032,740 | 6/1977 | Mittelmann | 219/667 |
| 4,214,164 | 7/1980 | Traub et al. | 250/338 |
| 4,355,222 | 10/1982 | Geithman et al. | 219/10.57 |
| 4,481,418 | 11/1984 | Vanzetti et al. | 250/338 |
| 4,574,172 | 3/1986 | Burack et al. | 219/667 |
| 4,617,441 | 10/1986 | Koide et al. | 219/10.77 |
| 4,619,533 | 10/1986 | Lucas et al. | 374/141 |
| 4,663,513 | 5/1987 | Webber | 219/121 |
| 4,717,801 | 1/1988 | Brolin et al. | 219/667 |
| 4,782,230 | 11/1988 | Heinzel | 250/338.1 |
| 4,794,619 | 12/1988 | Tregay | 374/131 |
| 4,806,723 | 2/1989 | Beynon et al. | 219/109 |

Primary Examiner—Philip H. Leung
Attorney, Agent, or Firm—Joan H. Pauly

[57] ABSTRACT

A fiber optic cable extends into the housing of an induction heater and has a sensing end positioned to confront a part being heated. Infrared radiation from the part is transmitted by the cable to a transducer. The transducer converts the infrared energy into an electrical signal that is used by a control circuit to control the heating operation. The control circuit has an internal electronic timer that is used in normal operation and to detect certain failure conditions. In normal operation, electromagnetic pulses are provided to the heater at a predetermined power level until the part reaches a predetermined temperature. Then the control circuit adjusts the power level to hold the part at the temperature for a brief holding period. The timer is used by the control circuit to detect failure to reach a desired temperature after a maximum delay and to detect dropping of the temperature below a minimum level during the holding period. The control circuit also detects overheating of the workpiece. The control circuit adjusts and terminates the power level through a silicon controlled rectifier which receives a pulse train from the control circuit.

18 Claims, 5 Drawing Sheets

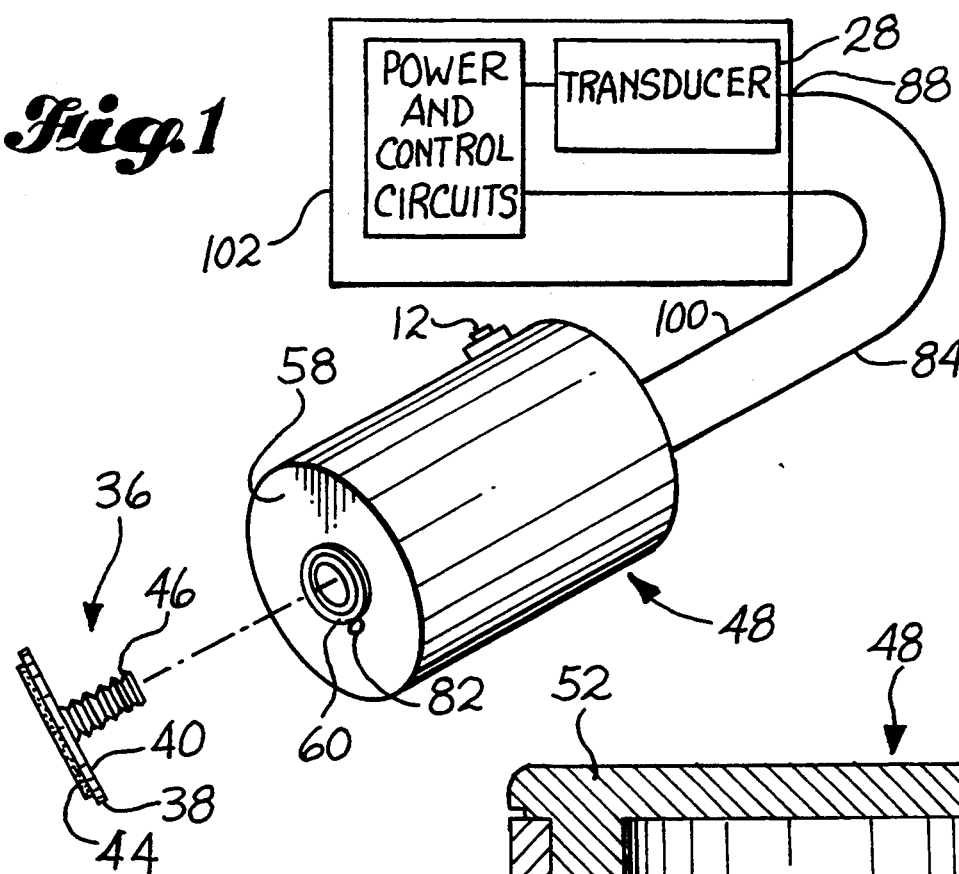
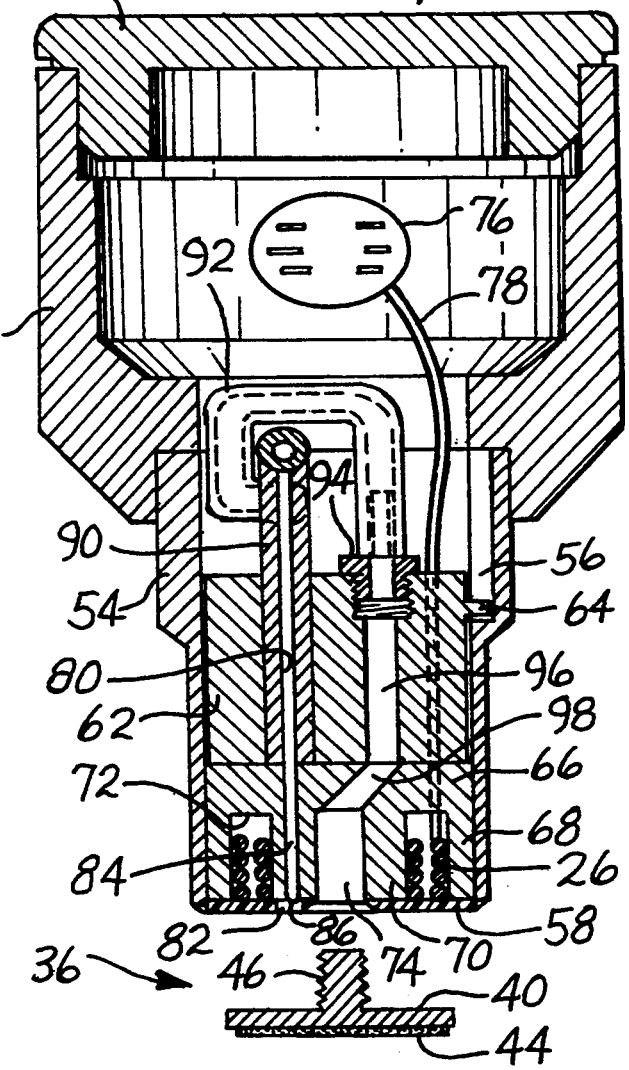
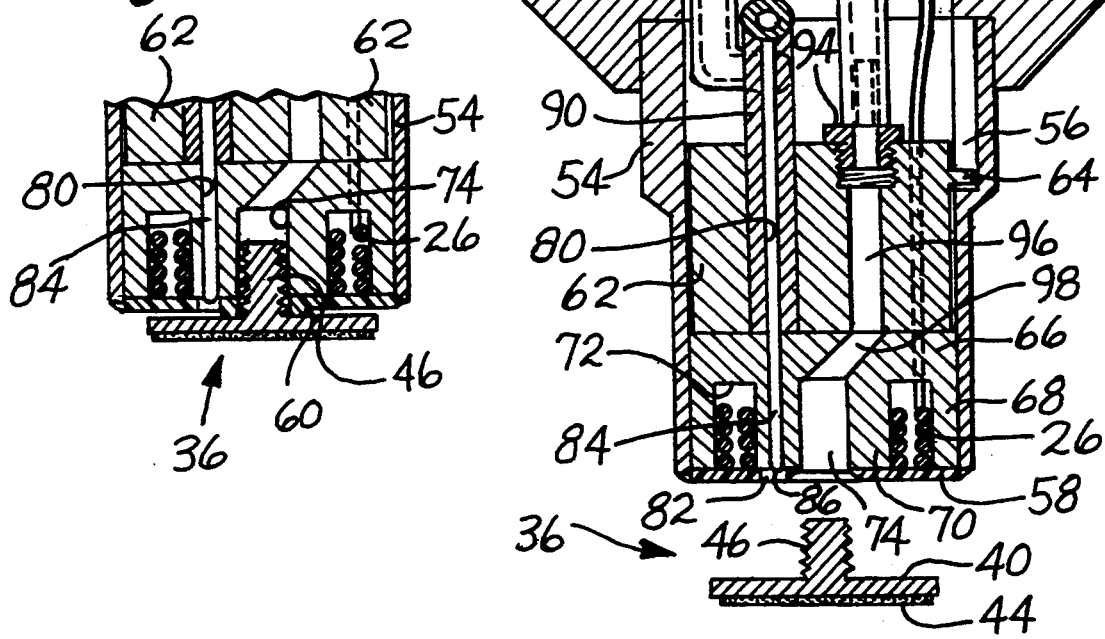

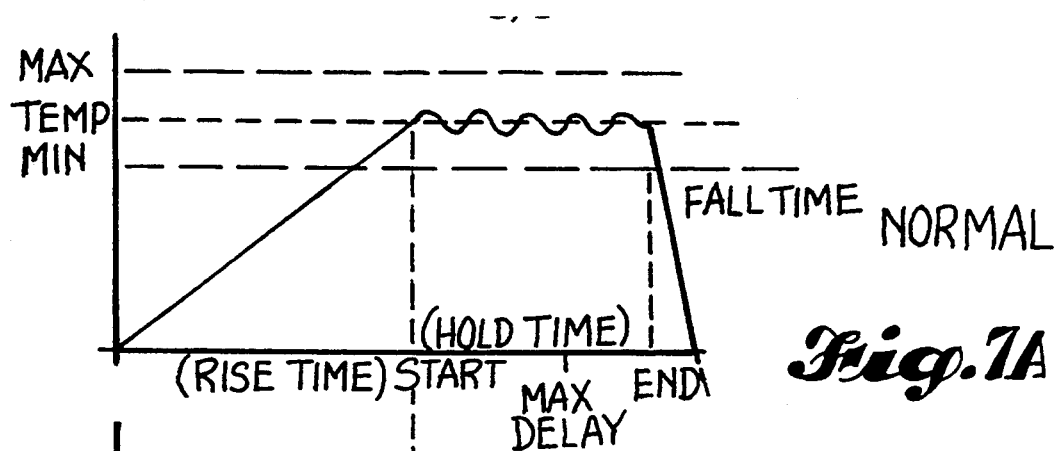
Fig. 7A NORMAL
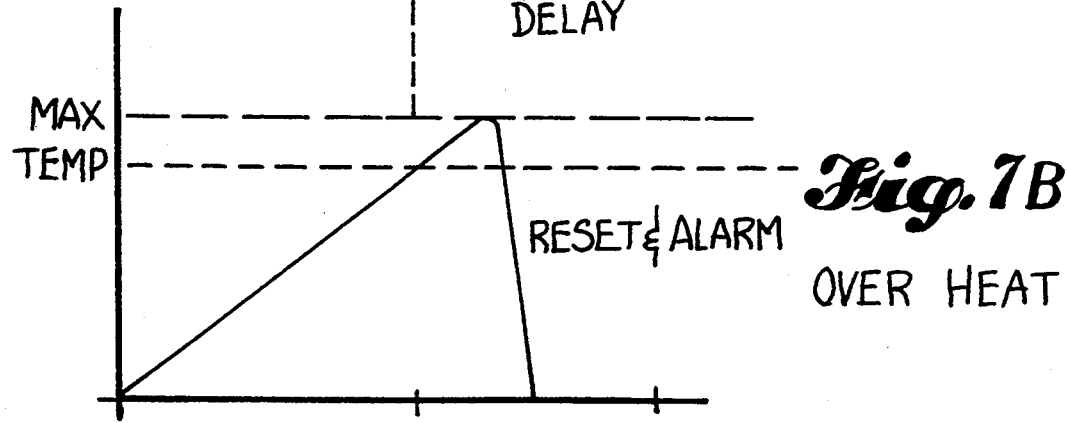
Fig. 7B OVER HEAT
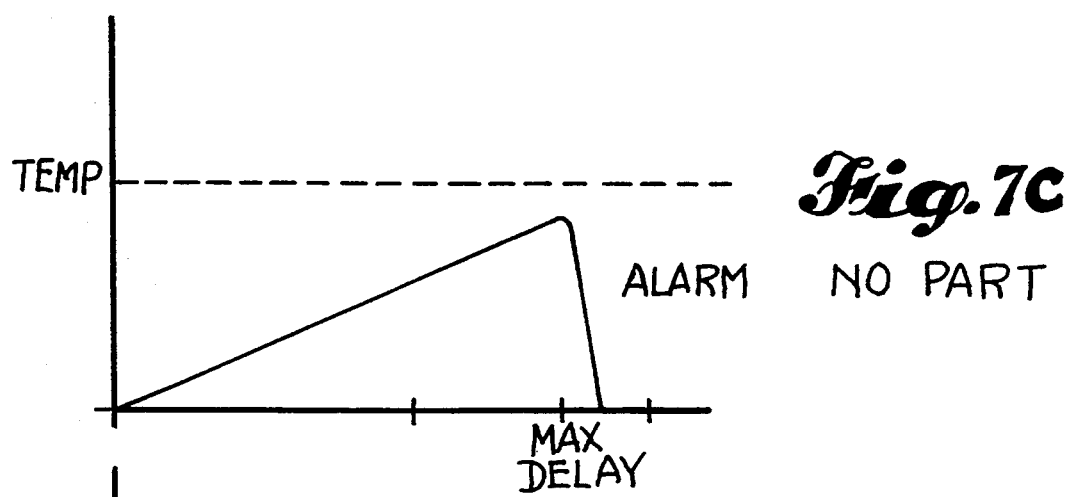
Fig. 7C NO PART
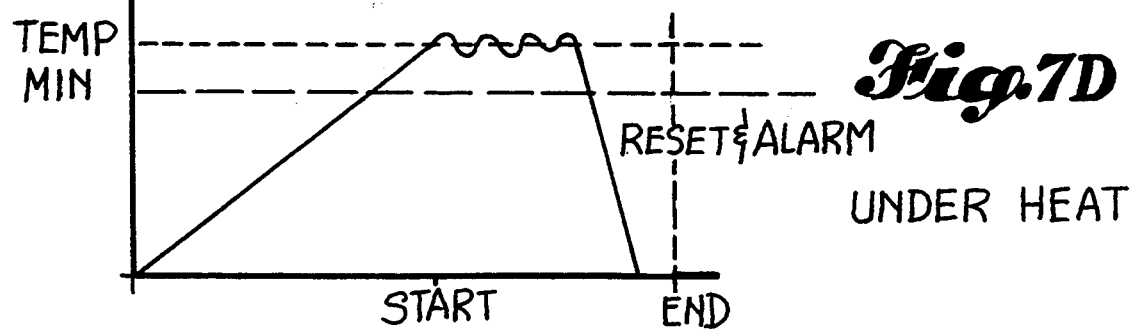
Fig. 7D UNDER HEAT

HOT MELT INDUCTION HEATER AND METHOD

TECHNICAL FIELD

This invention relates to systems for induction heating of hot melt fasteners and, more particularly, to such a system in which the heating head of an induction heater has a fiber optic cable with an end positioned to confront the base plate of a fastener during heating to receive and transmit infrared light emitted by the base plate. The light is converted to an electric signal which is used by a controller to control the heating process including a heating phase at a predetermined power level followed by a brief holding period to stabilize the heated fastener.

BACKGROUND INFORMATION

In modern aircraft, the cabin is typically lined with thin honeycomb panels that are attached to underlying structure. The attachments are accomplished by means of hot melt fasteners that are adhesively bonded to the back of the panels and have projecting studs that engage the structure. A typical hot melt fastener has a thin round base plate with a diameter of about ⅝ to one inch and a threaded stud projecting therefrom. A thermal or hot melt adhesive layer is bonded to the base plate on the back side opposite the stud. Hot melt induction heaters are used to heat the base plate and thereby melt the adhesive and bond the fastener to a sandwich panel.

Induction heaters for heating fastener base plates have been used for a number of years. Such a heater is disclosed in U.S. Pat. No. 4,355,222, granted Oct. 19, 1982, to Glenn A. Geithman et al. An earlier induction heater design is disclosed in U.S. Pat. No. 3,845,268, granted Oct. 29, 1974, to Melvin R. Sindt. The latter was designed for use with a different type of hot melt fastener which has, instead of the projecting threaded stud, a flange on the adhesive side that is received into an opening in the panel.

FIG. 4 is a simplified circuit diagram of the control system for the type of heater disclosed in U.S. Pat. No. 4,355,222. Referring to FIG. 4, a connector 2 (e.g. a plug) is connected through a fuse 4 to a main power switch 6. The system is activated by the operator pushing a trigger 12 that initiates an electromechanical timer 10 connected to the main switch 6 through a relay 8. Isolation transformer 14 is also energized by operation of the trigger 12. The transformer 14 provides a source of power that is isolated from the line for safety reasons. The transformer 14 is connected to a bridge 16 which, in turn, is connected to a power oscillator circuit 18, including a capacitor C1, coil 26 and coil 27. The power circuit 18 provides power to a work coil 26 which, when the heater is in use, supplies electromagnetic energy to the fastener base plate to heat the plate. A silicon controlled rectifier (SCR) 20 controls the energy pulses to the work coil 26. The system converts 110 volt alternating current to direct current and then creates a 35 kilohertz (KHz) signal.

A preset pulse train received by the SCR 20 determines the duty cycle of the electromagnetic pulses to the work coil 26, i.e. the on and off times of the pulses. In the system shown in FIG. 4, the duty cycle is about 5 KHz. The shorter the time between the 35 KHz signals, the higher the output power to the work coil 26. At the end of the heating time (about eight seconds), the timer 10 signals the end of the heating time by turning the unit off. During the operation of the heater, a control circuit 22 provides the pulse train to SCR 20. When the unit is turned off, stored energy is gradually discharged by elements 24, including capacitor C2 and resistor R2. The additional components and operation of the known system shown in FIG. 4 is further described in U.S. Pat. No. 4,355,222.

The system shown in FIG. 4 is intended to heat fasteners to approximately 460° F. This desired temperature provides the proper bonding of the fastener to the panel. A problem that has been encountered in connection with the known heater is that the units that are actually used tend to drift from their optimum setting, resulting in either overheating or underheating of the fasteners. Overheating creates shiny spots on the side of the panel facing the cabin which are blemishes on the decorative panels. Underheating results in low bond strength. Temperature variations are caused by a number of process variables. Such variables include line voltage variations, differences in the types of panels to which the fasteners are bonded, differences in the induction heating properties of the fasteners, variation in the efficiency of the electronic heater components over time, and operator hand pressure. Because of the lack of feedback in the system represented in FIG. 4, the known unit cannot compensate for most of these process variables.

SUMMARY OF THE INVENTION

The present invention is directed toward providing feedback in an induction heating system to solve the problem of process variables discussed above. The invention makes the system more consistent and reliable.

A subject of the invention is an inductor heater for hot melt fasteners of a type including a thin flat base plate having an inner surface and an opposite outer surface with a thermal adhesive thereon. According to an aspect of the invention, the heater comprises a heating head, a fiber optic cable, and a controller. The head includes a housing having at one end a flat base. An induction coil is positioned in the housing adjacent to the base to be adjacent to the inner surface of the base plate of a fastener when the base is placed parallel to and at least closely adjacent to the inner surface of the base plate. A passageway in the housing has a first end opening through the base. The cable extends from a sensing end just inside the first end opening of the passageway, through the passageway to a control end. The sensing end is positioned to confront the inner surface of the base plate of the fastener when the housing base is parallel and closely adjacent to the inner surface. The controller includes a transducer connected to the control end of the fiber optic cable to convert infrared light emitted by the base plate and transmitted through the cable into an electric signal. A power oscillator circuit is connected to the coil to supply electromagnetic pulses thereto and thereby heat the base plate. A control circuit is provided for adjusting the duty cycle of the pulses, and terminating the pulses, in response to the electric signal. When the heater is to be used with a hot melt fastener having a stud, the head preferably has an axial opening for receiving the stud.

A preferred feature of the heater is a vacuum line in the head communicating with the axial opening for the stud to supply suction in the axial opening. This feature provides an easy means for the fastener to be held by the heater when it is picked up and is being moved to be positioned on the back side of the panel. Another preferred feature of the invention is the positioning of the passageway. The portion of the passageway adjacent to the first end opening is preferably surrounded by the coil. In the preferred embodiment, the passageway extends from its first end opening between the coil and the axial opening. Another feature of the invention is a step on the outer surface of the heater housing base positioned to engage the inner surface of the fastener base plate to maintain an air gap between the outer surface of the heater housing base and the inner surface of the fastener base plate. This feature has the advantage of helping to prevent overheating of the components in the heating head. However, elimination of the air gap may increase the efficiency of the induction heating and, therefore, it may be desirable to eliminate the air gap in some situations.

The manner in which the control circuit adjusts the duty cycle may be varied. However, preferably the control circuit normally maintains a predetermined duty cycle until the base plate reaches a predetermined temperature and then adjusts the duty cycle to hold the base plate substantially at the predetermined temperature for a predetermined holding period. This procedure brings the base plate quickly to the desired temperature and stabilizes the adhesive bond by means of the holding period.

Another subject of the invention is apparatus for controlling induction heating of hot melt fasteners. According to an aspect of the invention, the apparatus comprises a heating head, a fiber optic cable, and a controller. The head includes an induction coil positioned to heat a portion of a fastener, and a passageway with an open end positioned to confront this fastener portion during heating. The fiber optic cable has a sensing end located just inside the open end of the passageway. The cable extends through the passageway to an opposite control end. The controller includes a transducer and a power oscillator, as described above. A control circuit of the controller receives the electric signal from the transducer and, in response to the signal, maintains a predetermined duty cycle of pulses to the fastener until the signal reaches a predetermined level corresponding to a predetermined temperature of the fastener portion. Then, the control circuit adjusts the duty cycle to hold the fastener portion substantially at this temperature for a predetermined holding period after which the pulses are terminated. Preferably, the control circuit includes an electronic timer to determine the total cycle.

Still another subject of the invention is a method of controlling induction heating of hot melt fasteners. According to an aspect of the invention, the method comprises positioning one end of a fiber optic cable to confront an inner base plate portion of a fastener during heating. Electromagnetic pulses at a predetermined power level are applied to the base plate portion to heat it. During heating, infrared energy emitted by the base plate portion and transmitted by the cable is converted into an electric signal. In response to this signal reaching a predetermined level corresponding to a predetermined temperature of the base plate portion, the duty cycle, and in turn the power level, is adjusted to hold the base plate portion substantially at the predetermined temperature for a predetermined holding period. At the end of the holding period, the supply of pulses to the base plate portion is ceased.

The method and apparatus of the invention preferably have one or more fail-safe features. When the electric signal does not reach a predetermined level after a given period of time, the system preferably automatically terminates the pulses to the fastener and generates an operator signal. If the temperature of a fastener drops below a predetermined minimum during the holding period, an underheat signal perceptible to an operator is preferably electronically generated. In the case of an overheating of the fastener, with the temperature of the fastener reaching a predetermined maximum, the system preferably automatically activates an alarm and terminates the pulses. During normal operation and in the abnormal conditions just discussed, the pulses are preferably terminated by ceasing a pulse train from the control circuit to a silicon controlled rectifier. Similarly, the power level is preferably adjusted by adjusting the pulse train.

The invention solves the problem of inconsistent results of the heating process due to lack of control of process variables. The infrared input into the controller from the fiber optic sensor gives the controller direct information regarding the temperature of the portion of the fastener being heated. This information is then used to ensure that the proper temperature is reached and overheating is avoided. In the preferred embodiment of the invention, the holding feature helps to stabilize the adhesive bond to further enhance the results. The additional features of the invention relating to the manner in which the controller operates achieve a highly reliable and consistent system to thereby help reduce labor costs and losses due to damaged panels. The system of the invention lends itself to relatively simple, lightweight, and easy to handle equipment and relatively low operating and maintenance costs. Thus, the overall system of the invention is highly cost effective.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a schematic pictorial view of the overall system of the invention.

FIG. 2 is a sectional view of the preferred embodiment of the heating head shown in FIG. 1.

FIG. 3 is a sectional view of the lower portion of the heating head shown in FIG. 2 modified to include a step on the lower base surface.

FIGS. 7A-7D are graphs illustrating normal and failure conditions in the operation of the system.

BEST MODE FOR CARRYING OUT THE INVENTION

Figure 4:
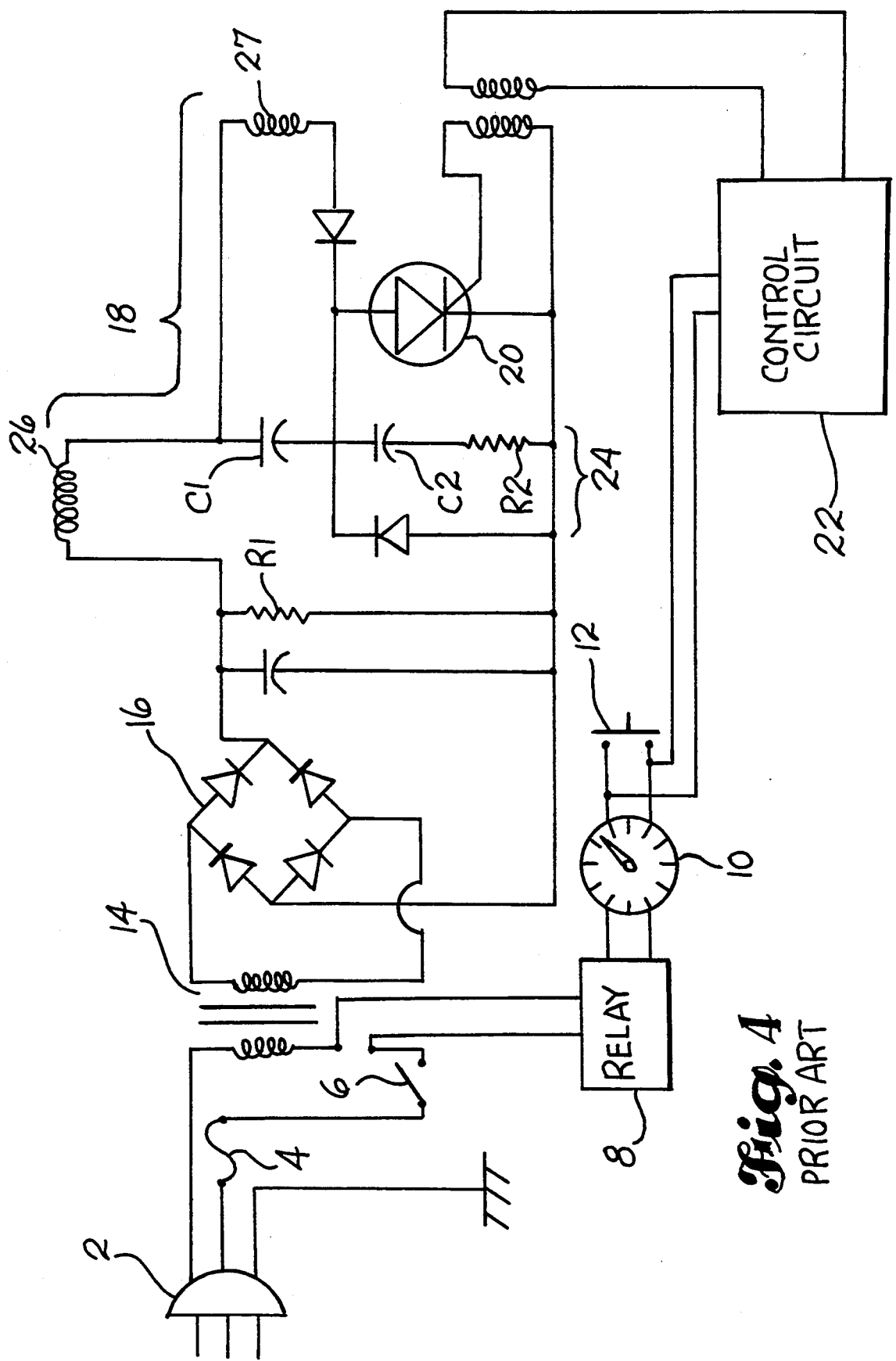
FIG. 4 is a simplified circuit diagram of a known control system for an induction heater.

Referring to FIG. 1, the system of the invention includes a heating head 48 connected to a controller 102 by a power line 100. The controller 102 includes a transducer 28 that receives an infrared signal via a fiber optic cable 84. The heating head 48 is designed to receive the stud 46 of a hot melt fastener 36. The stud 46 projects perpendicularly from the inner surface 40 of the base plate 38 of the fastener 36. A thermal adhesive 44 is positioned on the outer surface of the base plate 38 opposite the inner surface 40. The invention may also be used in connection with the heating of the type of fastener shown in U.S. Pat. No. 3,845,268.

The base 58 of the head 48 may be provided with an annular step 60 to provide an air gap between the outer radial surface of the base 58 and the inner surface 40 of the fastener 36, as illustrated in FIG. 3. The fiber optic cable 84 extends through the head 48 and terminates just inside an open end 82 of a passageway 80. The open end 82 extends through the base 58. The end of the cable adjacent to the open end 82 is a sensing end 86 (FIG. 2). The cable 84 extends from the sensing end 86 to an opposite control end 88 connected to the transducer 28.

Referring to FIG. 2, the preferred embodiment of the head 48 includes a three-part housing having a housing body 50 with an upper end closed by an end cap 52 and a reduced diameter probe end 54 opposite the end cap 52. The outer end of the probe end 54 is closed by a base 58. The housing parts 50, 52, 54 may be made from aluminum or a high temperature composite. The base 58 is preferably a ceramic or high temperature plastic material. A spacer 62 is positioned inside the hollow probe end 54 of the housing. The spacer 62 helps to position the induction heating core 66. The iron ferrite core 66 is positioned between the spacer 62 and the base 58 and is keyed to the spacer 62. The core 66 has a cup-like configuration similar to that shown in U.S. Pat. No. 4,355,222, cited above. The generally cylindrical configuration of the core 66 includes an outer portion 68 and an inner portion 70 separated by an annular space 72. The work coil 26 of the system, which provides electromagnetic heating to the fastener in a known manner, is located in the annular space 72. The inner cylindrical surface of the probe end 54 has a key slot 56 for receiving a key 64 carried by the spacer 62. The engagement of the key 64 in the slot 56 ensures proper angular orientation of the core 66. The coil 26 is energized by means of a switch 76 operated by a trigger 12 mounted on the outside of the housing. An electrical connection 78 extends from the switch 76 to the coil 26.

As can be seen in FIG. 2, the passageway 80 through the housing extends through the spacer 62 and the core 66. The portion of the passageway 80 adjacent to its open end 82 extends between the coil 26 and a center axial opening 74 in the base 58 and core 66. A guide tube 90 guides the pathway of the cable 84 through the passageway 80 as it extends through the spacer 62 and into the hollow interior of the head 48 to an opening on an outer surface of the head 48.

The center axial opening 74 is positioned and dimensioned to receive the stud 46 of a fastener 36 that is being engaged by the head 48 to heat the fastener base plate 38 and thereby melt the adhesive 44. A preferred feature of the invention is a vacuum line 92 that communicates with the axial opening 74. When suction is applied through the vacuum line 92, the fastener 36 is held in position on the lower end of the head 48 so that it may be easily moved into position on the panel to which it is to be bonded. The vacuum line 92 extends into the hollow interior of the housing and is connected to the spacer 62 by means of a connector 94. The line 92 communicates with the axial opening 74 by means of a passageway 96 in the spacer 62 and a passageway 98 in the core 66. FIG. 3 illustrates a fastener 36 being held in position on the lower end of the probe 54 by means of a vacuum. The probe end 54 shown in FIG. 3 is modified to have a step 60 thereon to provide an air gap, as described above.

Figure 5:
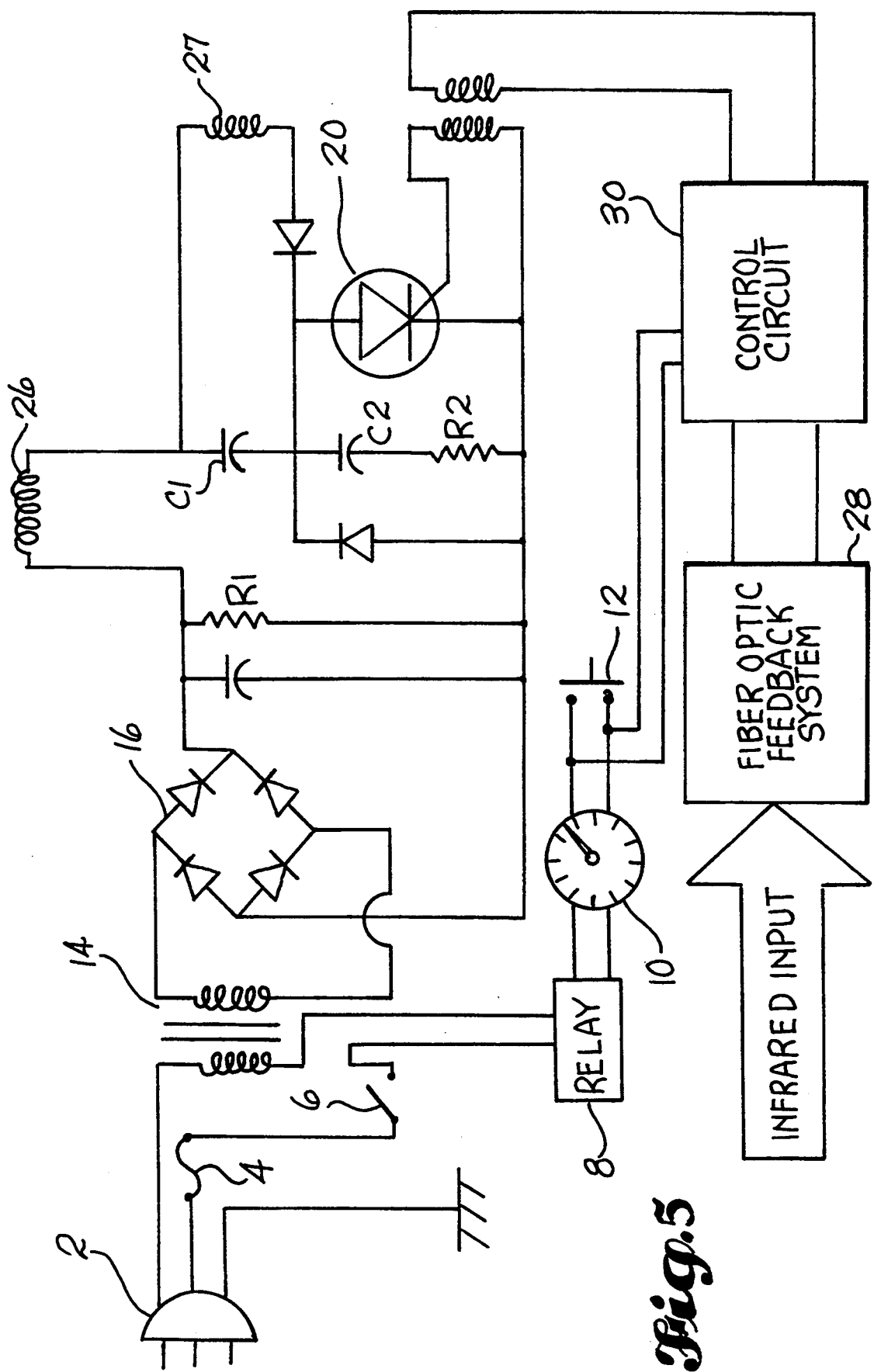
FIG. 5 is a simplified circuit diagram of an early embodiment of the invention.

FIG. 5 illustrates a simplified circuit diagram of an early embodiment of the control elements of the invention. The early embodiment included a fiber optic temperature probe like the one described above. The infrared input from the probe into the control system is indicated by an arrow in FIG. 5. During induction heating of the fastener, the proximity of the sensing end 86 of the fiber optic cable 84 through the open end 82 of the passageway 80 allows the cable 84 to directly receive infrared radiation emitted by the fastener base plate 38 being heated. This infrared input is transmitted to a transducer 28 which converts it into a proportional electrical signal. The control system shown in FIG. 5 is very similar to that shown in FIG. 4 with a major difference being modification of the control circuit 30 to process the electrical signal from the transducer 28. In the control circuit 30, the electrical signal is processed by a limit circuit and is used to signal the end of the heating cycle by turning the power off to the primary winding of the isolation transformer 14. In contrast, in the system illustrated in FIG. 4, the preset timer 10 signaled the end of the cycle.

Still referring to FIG. 5, the use of the infrared input into the control system makes it possible to compensate for the process variables discussed above. However, the early embodiment shown in FIG. 5 has some drawbacks. During testing, the current limiting circuit breaker (represented by the fuse 4 in FIG. 5) would trip at random. In addition, it was difficult to calibrate the unit. Another major problem was that there were no control features to ensure consistent quality, detect malfunctions in the fiber optic subsystem, and prevent shortcuts by the operator.

Figure 6:
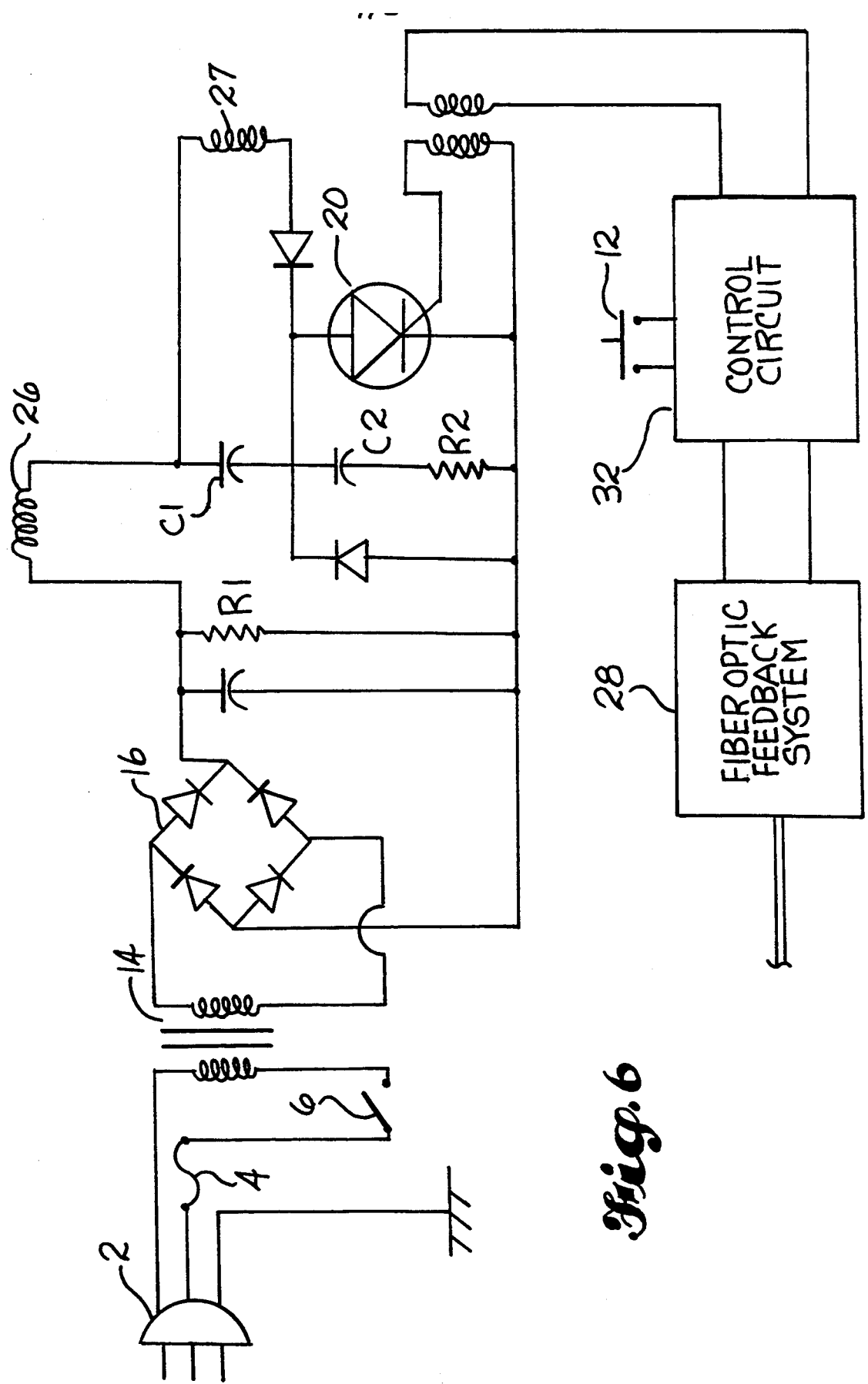
FIG. 6 is a simplified circuit diagram of the preferred embodiment of the control elements of the invention.

The currently preferred embodiment of the control system is shown in FIG. 6. This embodiment solves the problem discussed in the last paragraph. In the previous embodiment, a relay was used to shut the power off to the transformer 14. This arrangement creates a problem since, during a heating cycle, the power oscillator circuit stores energy and discharges it at a duty cycle rate. When a relay is used to shut incoming power off, the state of the power oscillator circuit at the time of shut down may allow a large discharge of electrical energy which trips the circuit breaker.

Referring to FIG. 6, the preferred embodiment uses the SCR 20 as the control element for turning the cycle on and off. The operation is begun by activation of the trigger 12 by an operator. When the trigger switch is operated, the control circuit 32 transmits the pulse train of the desired duty cycle of the pulses to be provided to the work coil 26. The SCR 20 receives the pulse train and is turned on and off by the pulse train. While this is occurring, the power oscillator circuit is generating the desired 35 KHz pulse. When the cycle has been completed, the pulse train to the SCR 20 is stopped and, with the SCR off, the path to ground through the SCR 20 is disrupted and no more induction energy is put out by the coil 26. With this arrangement of controlling the duty cycle via the SCR 20, unwanted tripping of the circuit breaker is avoided and the problem of discharge of stored energy following termination of the cycle is prevented.

In the operation of the system, a fastener is positioned relative to the heating head 48 as illustrated in FIG. 3. This positions the sensing end 86 of the fiber optic cable 84 to confront the base plate 38 of the fastener 36 during heating. The electromagnetic pulses are applied at a predetermined power level to the base plate 38 to heat the base plate 38. Since it is desired that the fastener 36 reach the melt temperature (e.g. 460° F.) as fast as possible, the predetermined power level is chosen to provide a maximum duty cycle for the fastest possible rise time, as illustrated in FIG. 7A. Once the fastener 36 has reached the desired melt temperature TEMP, the control circuit adjusts the duty cycle for a holding period of, for example, two seconds to hold the fastener 36 at the temperature TEMP and thereby stabilize the adhesive bond. The normal operation of the system is illustrated in FIG. 7A. Once TEMP is reached, the duty cycle is adjusted by means of a voltage control oscillator to maintain the temperature within about two degrees of the desired temperature TEMP. After the end of the predetermined hold period, the control circuit ceases the pulse train to the SCR 20 and the fastener cools, as indicated by the fall time line in FIG. 7A.

FIGS. 7B-7D illustrate malfunctions or operator error in the system. The preferred embodiment of the system has features that detect each of the illustrated errors and signals the operator. Referring to the OVER-HEAT graph below the NORMAL graph, a malfunction in the control circuit may cause the control circuit to fail to recognize that the temperature has reached the desired TEMP level and continue to heat the part. If this should occur, the temperature of the fastener will reach a preset MAX temperature, as illustrated in FIG. 7B. If this MAX temperature is reached, the cycle is immediately terminated, an overheat buzzer is sounded and an overheat light is turned on. The operator then must press a reset switch to clear the light and buzzer.

Another error that may occur is that the fastener will fail to reach the desired TEMP level during a predetermined period of time indicated by MAX DELAY in FIG. 7C. This could be due to a hardware malfunction or to operator error in which the trigger switch is activated with no fastener correctly positioned adjacent to the coil 26. When there is a failure to receive an electrical signal indicating the achievement of the TEMP level in the MAX DELAY time, the control circuit automatically shuts the unit off and sounds a buzzer.

FIG. 7D illustrates an underheat condition. In this condition, the cycle is erroneously terminated during the preset hold period due to a system malfunction or an operator shortcut. When the control circuit detects this condition due to a malfunction or an operator shortcut, it activates a buzzer and a signal light to alert the operator. The operator must press the reset switch to clear the light and buzzer. Similarly, if for any reason the temperature of the fastener falls to a preset minimum level during the hold period, the control circuit will recognize the incomplete cycle and signal the operator.

The control circuit 32 preferably includes an electronic timer. The timer is used to determine the hold period during normal operation, illustrated in FIG. 7A. It is also used to detect the no part and underheat conditions illustrated in FIGS. 7C and 7D.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. An induction heater for hot melt fasteners of a type including a thin flat base plate having an inner surface and an opposite outer surface with a thermal adhesive thereon, said heater comprising:

a heating head including a housing having at one end a flat base, an induction coil in said housing positioned adjacent to said base to be adjacent to the inner surface of the base plate of a hot melt fastener when said base is placed parallel to and at least closely adjacent to said inner surface, and a passageway in said housing having a first end opening through said base;

a fiber optic cable extending from a sensing end just inside said first end opening of said passageway, through said passageway to a control end, said sensing end being positioned to confront said inner surface of said base plate when said base is parallel and closely adjacent to said inner surface; and a controller including a transducer connected to said control end of said fiber optic cable to convert infrared light emitted by said base plate and transmitted through said cable into an electric signal, a power oscillator circuit connected to said coil to supply electromagnetic pulses thereto and thereby heat said base plate, and a control circuit for automatically adjusting the duty cycle of said pulses, and terminating said pulses, in response to said electric signal.

2. The heater of claim 1, in which said head has an axial opening for receiving a stud projecting from said base plate when said base is parallel and closely adjacent to said inner surface.

3. The heater of claim 2, in which said head includes a vacuum line communicating with said axial opening to supply suction to said axial opening.

4. The heater of claim 2, in which said passageway extends from said first end opening between said coil and said axial opening.

5. The heater of claim 1, in which said coil surrounds a portion of said passageway adjacent to said first end opening.

6. The heater of claim 1, comprising a step on an outer surface of said base positioned to engage said inner surface of said base plate to maintain an air gap between said outer surface of said base and said inner surface of said base plate.

7. The heater of claim 1, in which said control circuit normally maintains a predetermined duty cycle until said base plate reaches a predetermined temperature and then adjusts the duty cycle to hold said base plate substantially at said temperature for a predetermined holding period.

8. Apparatus for controlling induction heating of hot melt fasteners, comprising:

a heating head including an induction coil positioned to heat a portion of a fastener, and a passageway with an open end positioned to confront said portion during heating;

a fiber optic cable with a sensing end located just inside said open end, said cable extending through said passageway to an opposite control end; and a controller including a transducer connected to said control end of said fiber optic cable to convert infrared light emitted by said portion of the fastener and transmitted through said cable into an electric signal, a power oscillator circuit connected to said coil to supply electromagnetic pulses thereto and thereby heat said portion, and a control circuit for receiving said electric signal and, in response to said signal, maintaining a predetermined duty cycle of said pulses until said signal reaches a predetermined level corresponding to a predetermined temperature of said portion and then automatically adjusting the duty cycle to hold said portion substantially at said temperature for a predetermined holding period and then terminating said pulses.

9. The apparatus of claim 8, in which said control circuit includes an electronic timer to determine said holding period.

10. The apparatus of claim 9, in which said control circuit activates an operator signal if the temperature of said portion drops below a predetermined minimum temperature during said holding period.

11. The apparatus of claim 8, in which said control circuit includes an electronic timer and automatically terminates said pulses if said portion has failed to reach said predetermined temperature when said timer indicates a maximum delay.

12. The apparatus of claim 11, in which said control circuit activates an operator signal if the temperature of said portion drops below a predetermined minimum temperature during said holding period.

13. The apparatus of claim 8, in which said control circuit automatically triggers an alarm and terminates said pulses if said signal reaches a level corresponding to a predetermined maximum temperature.

14. The apparatus of claim 8, comprising a silicon controlled rectifier connected to said control circuit to receive a pulse train from said control circuit that determines the duty cycle, said control circuit terminating said pulse train to terminate said pulses.

15. A method of controlling induction heating of hot melt fasteners, comprising:
 positioning one end of a fiber optic cable to confront a base plate portion of a fastener during heating;
 applying electromagnetic pulses at a predetermined power level to said base plate portion to heat said base plate portion;
 while heating said base plate portion, converting infrared light emitted by said portion and transmitted by said cable into an electric signal;
 in response to said electric signal reaching a predetermined level corresponding to a predetermined temperature of said base plate portion, adjusting said power level, by electronically adjusting a pulse train from a control circuit to a silicon controlled rectifier, to hold said base plate portion substantially at said temperature for a predetermined holding period; and
 at the end of said period, ceasing to supply pulses to said base plate portion by stopping said pulse train.

16. The method of claim 15, comprising performing the steps of positioning said cable, applying said pulses, and converting said light on a plurality of fasteners; and, if for any of said fasteners said level of said signal is not reached after a predetermined maximum delay, automatically terminating said pulses and generating an operator signal.

17. The method of claim 15, comprising performing the steps of positioning said cable, applying said pulses, and converting said light on a plurality of fasteners; and, if the temperature of any of said fasteners drops below a predetermined minimum during said holding period, electronically generating an underheat signal perceptible to an operator.

18. The method of claim 15, comprising performing the steps of positioning said cable, applying said pulses, and converting said light on a plurality of fasteners; and, if the temperature of any of said fasteners reaches a maximum temperature, automatically activating an alarm and terminating said pulses.

* * * * *